US012760535B2

(12) United States Patent
Prossegger

(10) Patent No.: US 12,760,535 B2
(45) Date of Patent: Oct. 13, 2026

(54) WALL SKIRTING FOR FLOOR COVERINGS AND METHOD OF MANUFACTURING A WALL SKIRTING

(71) Applicant: Walfred Prossegger, Techelsberg (AT)

(72) Inventor: Walfred Prossegger, Techelsberg (AT)

( * ) Notice: Subject to any disclaimer, the term of this patent is extended or adjusted under 35 U.S.C. 154(b) by 173 days.

(21) Appl. No.: 18/480,011

(22) Filed: Oct. 3, 2023

(65) Prior Publication Data

US 2024/0125131 A1 Apr. 18, 2024

(30) Foreign Application Priority Data

Oct. 7, 2022 (EP) .................................... 22200228

(51) Int. Cl.

*E04F 19/04* (2006.01)
*B29C 69/00* (2006.01)
*B29D 99/00* (2010.01)
*B29K 27/06* (2006.01)
*B29K 311/04* (2006.01)

(52) U.S. Cl.

CPC ........ *E04F 19/0486* (2013.01); *B29C 69/001* (2013.01); *B29D 99/001* (2013.01); *B29C 2793/0054* (2013.01); *B29K 2027/06* (2013.01); *B29K 2311/04* (2013.01); *E04F 2019/0427* (2013.01)

(58) Field of Classification Search

CPC ..... E04F 19/04; E04F 19/0477; E04F 19/045; E04F 19/0486; E04F 19/0427; E04F 19/0413; E04F 19/0436; E04F 2019/0422; E04F 15/163

USPC ........................................................... 52/273

See application file for complete search history.

(56) References Cited

U.S. PATENT DOCUMENTS

| | | | | | |
|---|---|---|---|---|---|
| 1,503,929 | A * | 8/1924 | Tracy | E04F 19/04 | 52/273 |
| 3,635,787 | A * | 1/1972 | Shanok | E04F 19/04 | 428/167 |
| 4,052,830 | A * | 10/1977 | Smith | E06B 3/5871 | 52/288.1 |
| 4,391,303 | A * | 7/1983 | Holgersson | H02G 3/0487 | 428/167 |
| 5,203,640 | A * | 4/1993 | Pourtau | E04F 15/02027 | 52/287.1 |
| 6,354,057 | B1 * | 3/2002 | Ploplis | B29C 66/1162 | 52/287.1 |
| 6,802,161 | B1 * | 10/2004 | Robinson | A47K 3/008 | 52/287.1 |
| 2016/0160510 | A1 * | 6/2016 | O'Brien | E04F 19/0477 | 52/287.1 |

(Continued)

FOREIGN PATENT DOCUMENTS

| | | | |
|---|---|---|---|
| EP | 1514979 | A1 | 3/2005 |
| EP | 4030016 | A1 | 7/2022 |

*Primary Examiner* — Kyle J. Walraed-Sullivan

(74) *Attorney, Agent, or Firm* — FisherBroyles, LLP; Roger L. Browdy; Ronni S. Jillions

(57) ABSTRACT

Factory-prefabricated wall skirting for floor coverings made of plastic, PVC, rubber, linoleum or similar materials, for manufacturing a moisture-proof wall closure, wherein the floor-side wall skirting is produced from a strip cutting of the floor covering and comprises a bending area, about which the strip cutting is bent, wherein in the convex bending area of the strip cutting the material is partially removed and replaced by a filling material.

12 Claims, 6 Drawing Sheets

(56) References Cited

U.S. PATENT DOCUMENTS

Figures 1, 2:
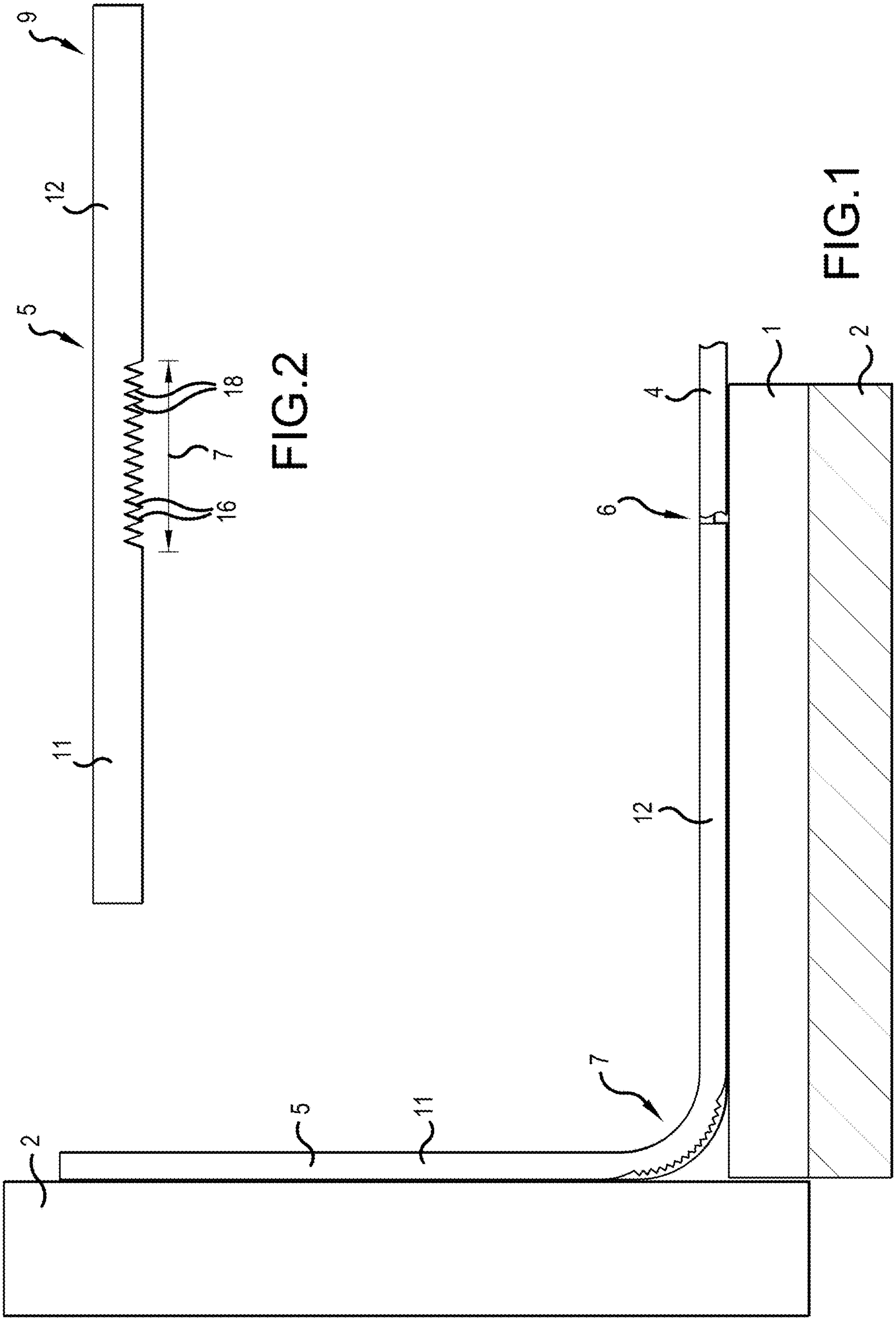

| | | | | |
|---|---|---|---|---|
| 2016/0215508 | A1* | 7/2016 | Kimel | E04F 19/045 |
| 2025/0137265 | A1* | 5/2025 | Yang | E04F 15/166 |

* cited by examiner

WALL SKIRTING FOR FLOOR COVERINGS AND METHOD OF MANUFACTURING A WALL SKIRTING

The invention relates to a wall skirting for floor coverings made of plastic, PVC, rubber, linoleum or similar materials, for manufacturing a moisture-proof wall closure and a method for manufacturing a wall skirting.

Floor coverings with wall skirtings are mainly used in public buildings, such as hospitals, retirement and nursing homes, laboratories, kindergartens or schools. Such floor coverings must be configured to be absolutely moisture-proof in these buildings and are sometimes highly stressed.

A wall skirting is understood to be a trough-shaped installation of a floor covering. Such a wall skirting is arranged in the transition area between the screed and the adjacent walling and is connected with the floor covering. The wall skirting thus provides a seamless transition from the floor covering to the adjacent wall surface.

The wall skirtings are cut on site from the actual floor covering as strips with a cutter knife or with a miter saw, bent manually and installed in the transition area between the screed and the walling. The bent wall skirting has a convex bend on the rear side, whereby in installed state a type of coved fillet results. Such a coved fillet represents a weak point, as this is a cavity which can be damaged if subjected to a compressive load, whereby the wall skirting is no longer moisture-proof.

Wall skirtings which are prefabricated by machine are, moreover, already known from the prior art, which are also known as coved fillet strips. In the manufacture of such a wall skirting, a strip is first cut out by machine from a floor covering made, for example, of plastics, PVC, rubber, linoleum or similar materials. The strip cutting is thereinafter bent along its longitudinal axis, preferably in a shaping device, so that the strip cutting can be laid in the transition area between the screed and the walling arranged at 90° to the screed. On the building site, only the bent wall skirting is then installed and connected to the rest of the floor covering, whereby a uniform surface results.

To prevent mechanical damage, for example, a tearing of the wall skirting in the transition area, attempts have been made to reinforce the bending area of the wall skirting with stop wedges, whereby the wall skirting becomes more impact and pressure resistant. For example, a continuous wedge-shaped support body made of PVC is attached to the back. The support body is configured as a separate part and is glued into the transition area between the screed and the walling.

EP 1 514 979 A1 discloses a method of manufacturing a wall skirting for floor coverings. The present application refers back to the same applicant and full reference is made to said patent.

In methods according to EP 1 514 979 A1, a strip cutting is first created and bent into the desired shape using a shaping device. A permanently elastic edge support wedge is then applied to the convex bending area. The wall skirting produced by the method therefore already comprises an elastic coved fillet reinforcement bonded to it. As the edge support wedge is attached to the surface of the wall skirting at the factory, no further support wedge needs to be installed at the building site.

In part, the wall skirting is manufactured of a very resilient material with only limited elasticity. During the manufacture of the wall skirting, high stresses are created by the process of bending of the strip cutting.

These stresses are transferred to the applied PVC edge support wedge, whereby in turn the edge support wedge can detach from the surface of the wall skirting and a reinforcement in the bending area is not guaranteed in a permanent manner.

The task of the present invention is therefore to now provide a wall skirting with an edge support wedge which has a better and permanent supporting effect.

To solve the given task, a factory-prefabricated wall skirting is provided for floor coverings made of plastic, PVC, rubber, linoleum or similar materials, for manufacturing a moisture-proof wall closure, wherein the floor-side wall skirting is produced from a strip cutting of the floor covering and comprises a bending area, about which the strip cutting is bent, wherein in the convex bending area of the strip cutting, the material of the strip cutting is partially removed and replaced by a filling material.

An essential feature of the invention is that in the convex bending area of the strip cutting, the material is partially removed and replaced by a filling material.

By partially removing the material and filling this area with a filling material, a kind of anchoring of the filling material in the wall skirting takes place. A detachment of the filling material is thus largely prevented. The elastic material can move along and maintains a constant bend of the wall skirting.

The wall skirting according to the invention is preferably manufactured in the factory. The cutting to size, the machining of the bending area and the bending process can therefore all be carried out by machine. This ensures, in particular, that a consistent quality is achieved. The factory-prefabricated wall skirting thus has the advantage that it is delivered to the building site as a finished part and already has the desired side leg dimensions and a bend with the desired radius. On the building site, there is thereby no need for strip cutting of the floor covering or bending, but rather only a joining of the wall skirting to the floor covering. The fitting of an additional bottom profile or alternatively support profile is no longer necessary.

In a first preferred embodiment, the wall skirting comprises a bending area with lamellae and groove areas. The lamellae and groove areas alternate and are manufactured by partial removal of the material. The lamellae therefore form the wave crest and the groove areas form the wave trough. Preferably, only the groove areas are manufactured by a shaving removing production, whereby the lamellae come to be automatically. The lamellae are thus the original floor covering material, which has the same height or material thickness. After the manufacture of the lamellae and of the groove areas, the strip cutting is bent to the required dimension. Subsequently, filling material is filled into the curved, convex bending area. The filling material is located, at least partially, in the groove areas and thereby supports the two adjacent lamellae. The filling material therefore has a supporting effect which maintains the curved shape of the strip cutting or of the wall skirting.

The filling material fills either only part of the groove area or the entire groove area. In the case of complete filling, the height of the lamellae is reached with the filling material. It is, however, also possible for the filling material to protrude beyond the lamellae such that the additional material forms a type of support wedge.

The wall skirting is bent in the bending area, whereby a first side leg is created which is later connected to the walling and a second side leg is created which is connected to the screed. Preferably, the wall skirting is bent in such a way that the two side legs are arranged at a right angle to each other. Of course, other angles between the two side legs (for example, 75° or 110°) can also exist.

The floor coverings with the wall skirtings can be used, for example, in homes, healthcare, education, sports, retail, industry, offices, hospitality and transportation vehicles.

The floor covering is, for example, a roll, tile or plank material and consists, for example, of PVC, rubber, linoleum or related materials.

The material of the wall skirting is preferably the same material as the floor covering. The floor covering normally has a certain elasticity. This means that in the case of a bending operation that has taken place, the material will be pressed back into its original shape. In order to prevent this, the wall skirting according to the invention has a filling material in the convex bending area, which filling material is filled into the groove area between the lamellae and which supports the lamellae against each other.

The filling material consists, for example, of a plastic (for example, permanently elastic plastic, thermoplastic, elastomer), an adhesive (for example, hotmelt adhesive) or another material. The filling material serves to stiffen or consolidate the curved shape of the wall skirting.

The filling material is preferably filled up to the upper edge of the lamellae of the wall skirting. The material thickness in the bending area then corresponds to the material thickness of the wall skirting. It is, however, also possible for the filling material to protrude beyond the lamellae and form a certain shape. The filling material then forms a kind of edge support wedge, the shape of which is adapted to the respective installation situation of the wall skirting. The height of the filling material above the lamellae can be, for example, up to 8 mm.

In a preferred embodiment, the wall skirting comprises lamellae and groove areas with a specific pattern in the convex bending area. The pattern may, for example, have a serrated, wavy or angular shape. That which is decisive is that the groove areas are selected to be large enough to allow the filling material to be filled in and thereby develop its supporting effect between the lamellae of the wall skirting.

The lamellae and groove areas can, for example, extend in the direction of the longitudinal axis or perpendicular to the longitudinal axis of the strip cutting. It is, however, also possible that the lamellae and groove areas are arranged at a certain angle with respect to the longitudinal axis of the wall skirting.

In another preferred embodiment, the groove area is a single planar recess. The wall skirting then comprises a connecting strip in the bending area, which connecting strip is not machined. A flat recess attaches to the connecting strip, which recess is later filled with the filling material.

The wall skirting according to the invention preferably breaks down into a first side leg, a bending area and a second side leg. The first side leg has, for example, a length of 10 cm and the second side leg a length of 10 cm. It is also possible that side legs of 10 cm to 6 cm or other ratios are also possible. The two side legs are, for example, arranged at a right angle to each other.

In addition to the wall skirting, protection is further claimed for a method of manufacturing a factory-prefabricated, strip-shaped wall skirting made of plastic, PVC, rubber, linoleum or related materials.

The method according to the invention consists of the following steps:

- machine strip cutting of a floor covering;
- partial removal of the material of the strip cutting in the future bending area of the wall skirting;
- bending of the strip cutting in a shaping device, whereby a convex bending area comes to be on the rear side of the strip cutting (9);
- introducing a filling material made of permanently elastic plastic into the convex bending area.

In a further preferred execution of the method, the following steps are performed:

- machine strip cutting of the wall skirtings;
- feeding of the strip cutting into a shaping device and partial removal of the material in a bending area, whereby lamellae and groove areas are manufactured;
- bending of the strip cutting in the bending area by the shaping device, whereby a convex bending area comes to be on the rear side of the strip cutting;
- introducing a filling material of permanently elastic plastic into the convex bending area, wherein the filling material is arranged between the lamellae in the groove areas.

The filling material can, for example, be filled beyond the lamellae as a further process step, whereby the material thickness of the bending area is greater than the material thickness of the wall skirting.

The removal of the material in the bending area is preferably carried out by a shaving removing process. This can be, for example, a milling of the strip cutting. It is, however, also possible that the lamellae and groove areas are created using a laser.

The strip cuttings can, moreover, be heated before filling with the filling material. In so doing, a better connection between the filling material and the slats or alternatively the groove areas can be achieved.

During the assembly of the wall skirting, it is preferably cut to the desired length on the building site using a cutter knife or a miter saw. The length of the wall skirting strips is, for example, 240 cm, which makes them easy to handle and enables an efficient laying performance.

The subject-matter of the present invention results not only from the subject-matter of the individual patent claims, but also from the combination of the individual patent claims among themselves.

All details and features disclosed in the documents, including the abstract, in particular the spatial configuration shown in the drawings, are claimed to be substantial to the invention insofar as they are new, either on their own or in combination, when compared to the prior art.

In the following, the invention is elucidated in more detail by means of figures illustrating several embodiments. Further features and advantages of the invention that are essential to the invention are apparent from the drawings and their description.

FIG. 1: is a schematic representation of an installed wall skirting

Figure 3:
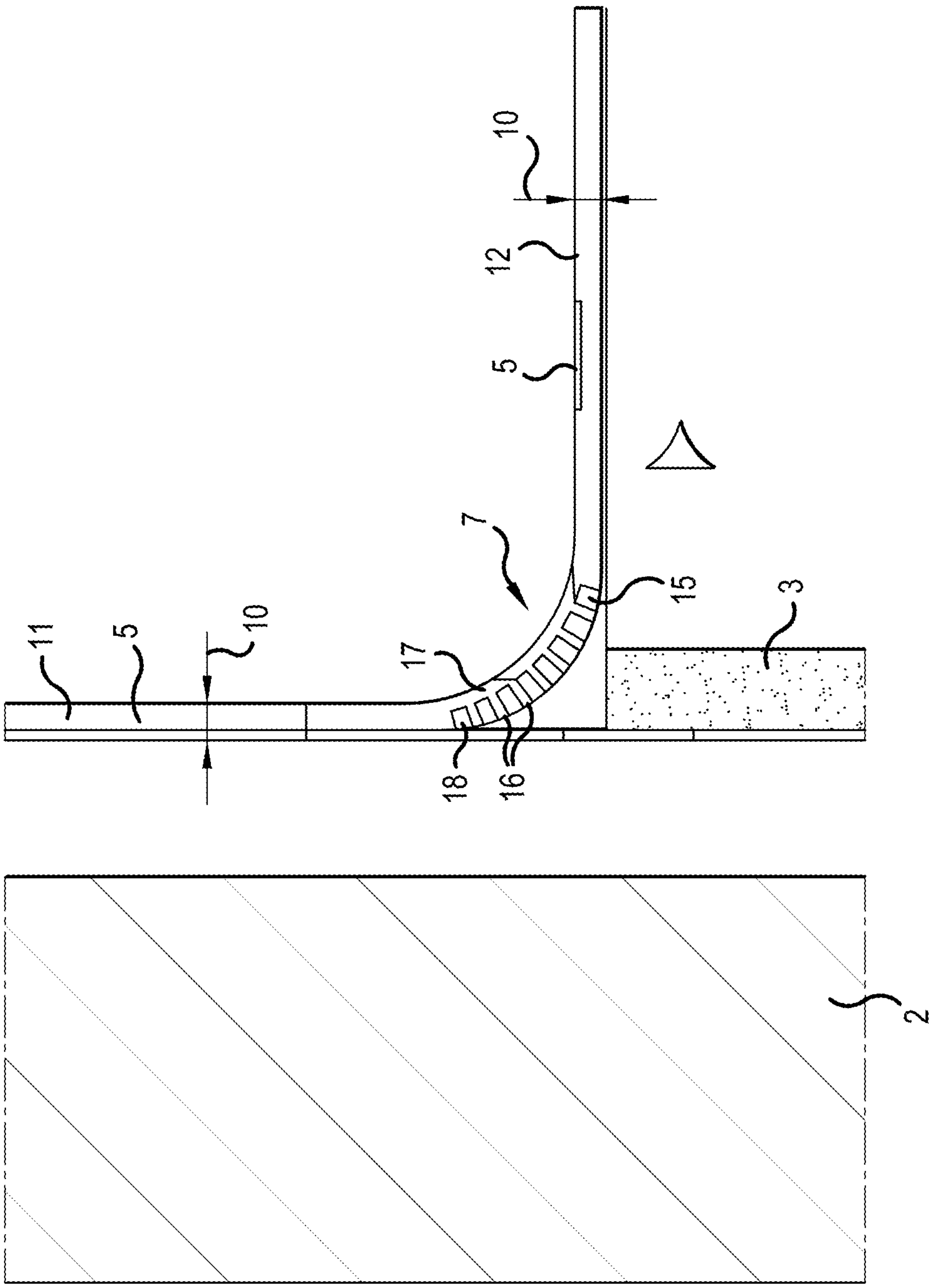

FIG. 2: is a schematic representation of a strip cutting with lamellae and groove areas FIG. 3: is a detailed representation of the bending area of the wall skirting according to FIG. 1

Figure 4:
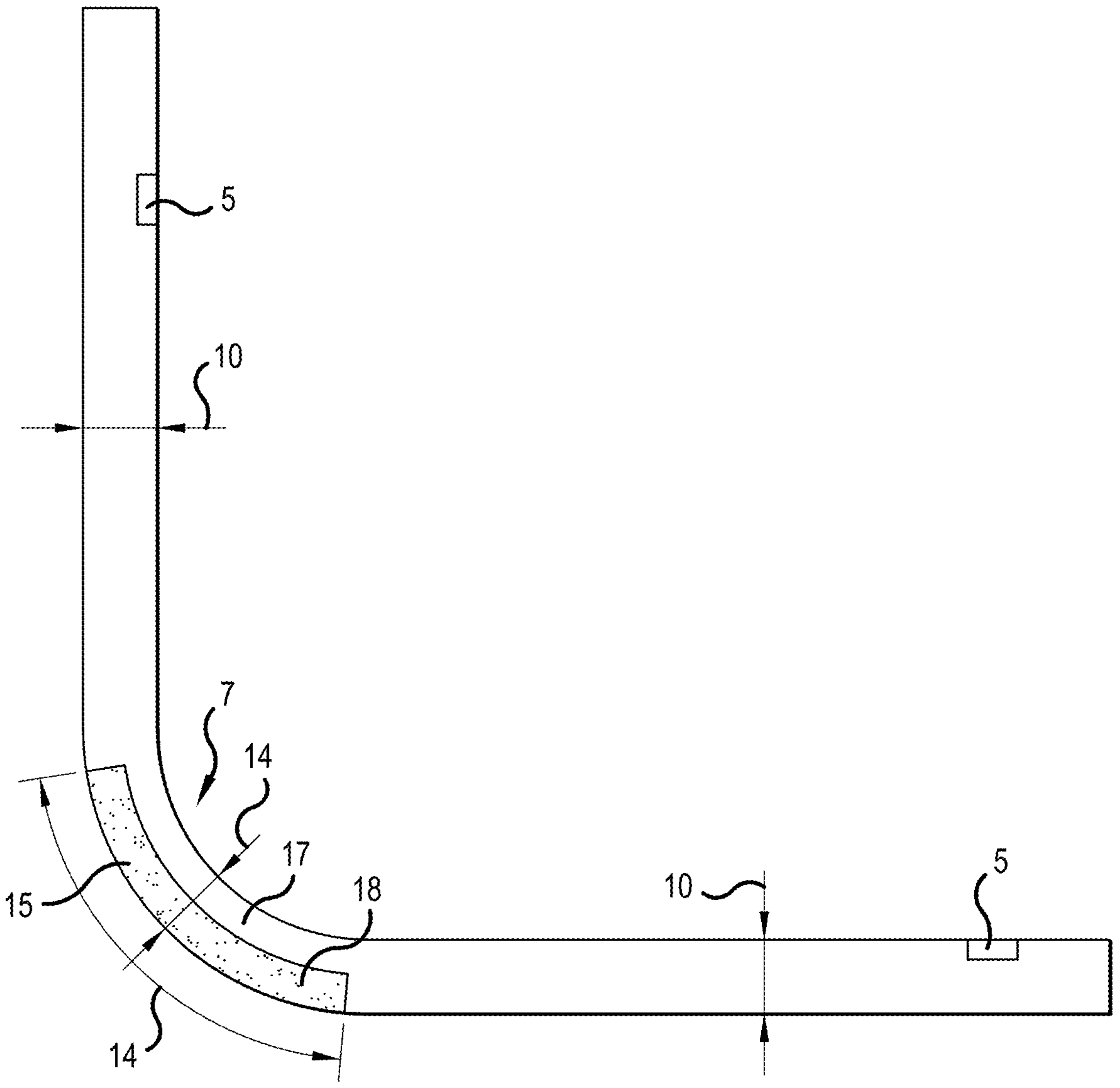
Figure 7:
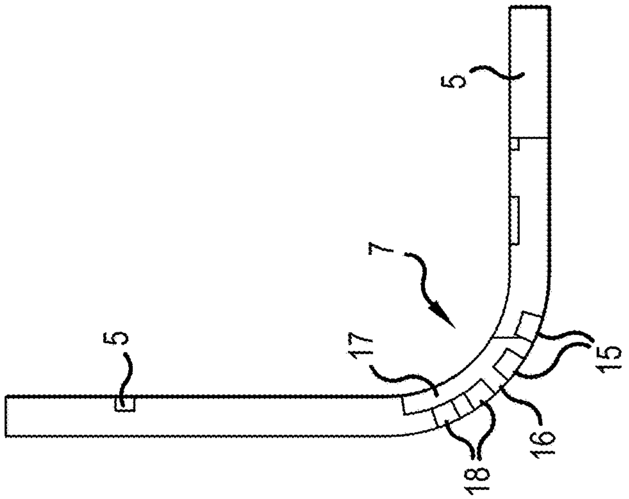
Figure 6:
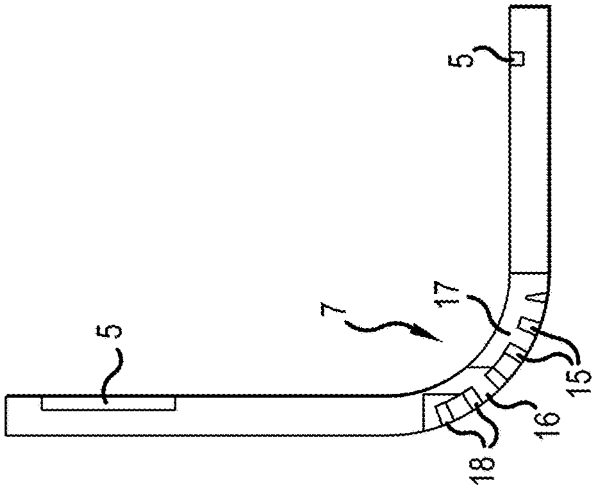
Figure 5:
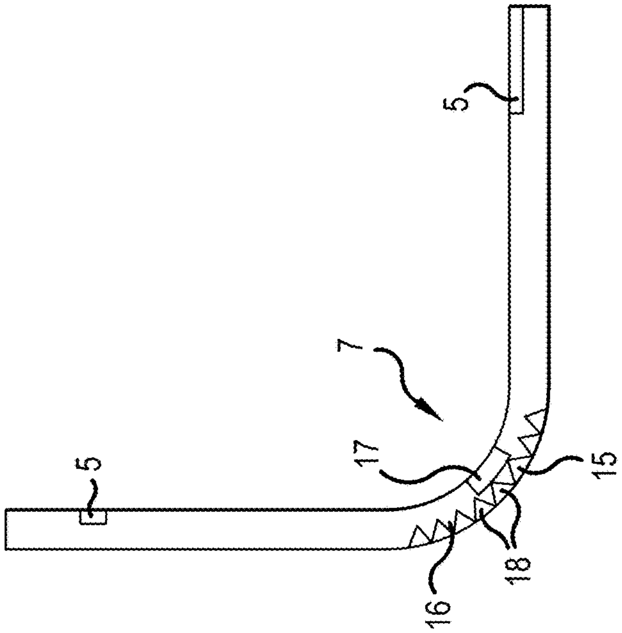
Figure 8:
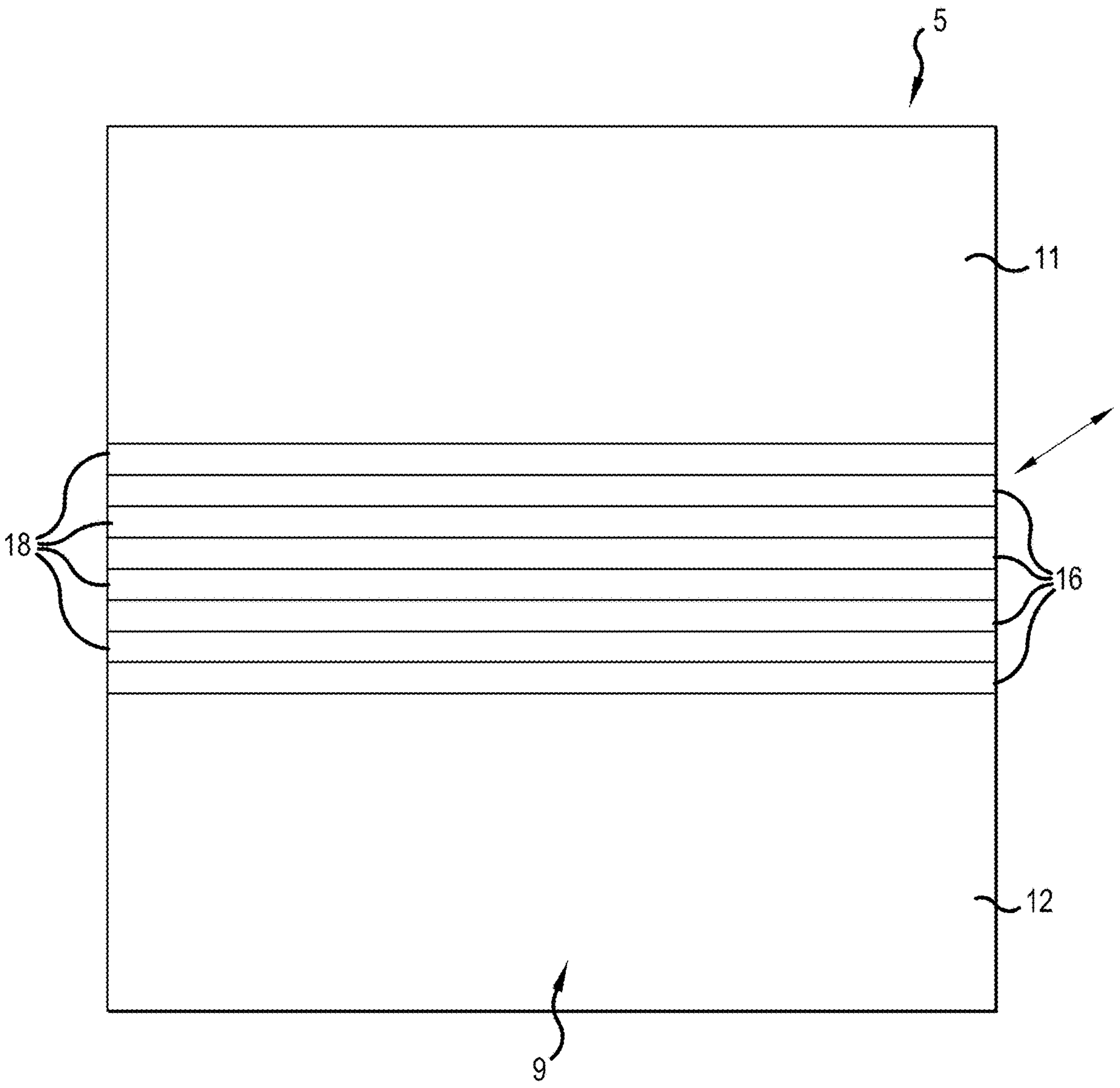
Figure 9:
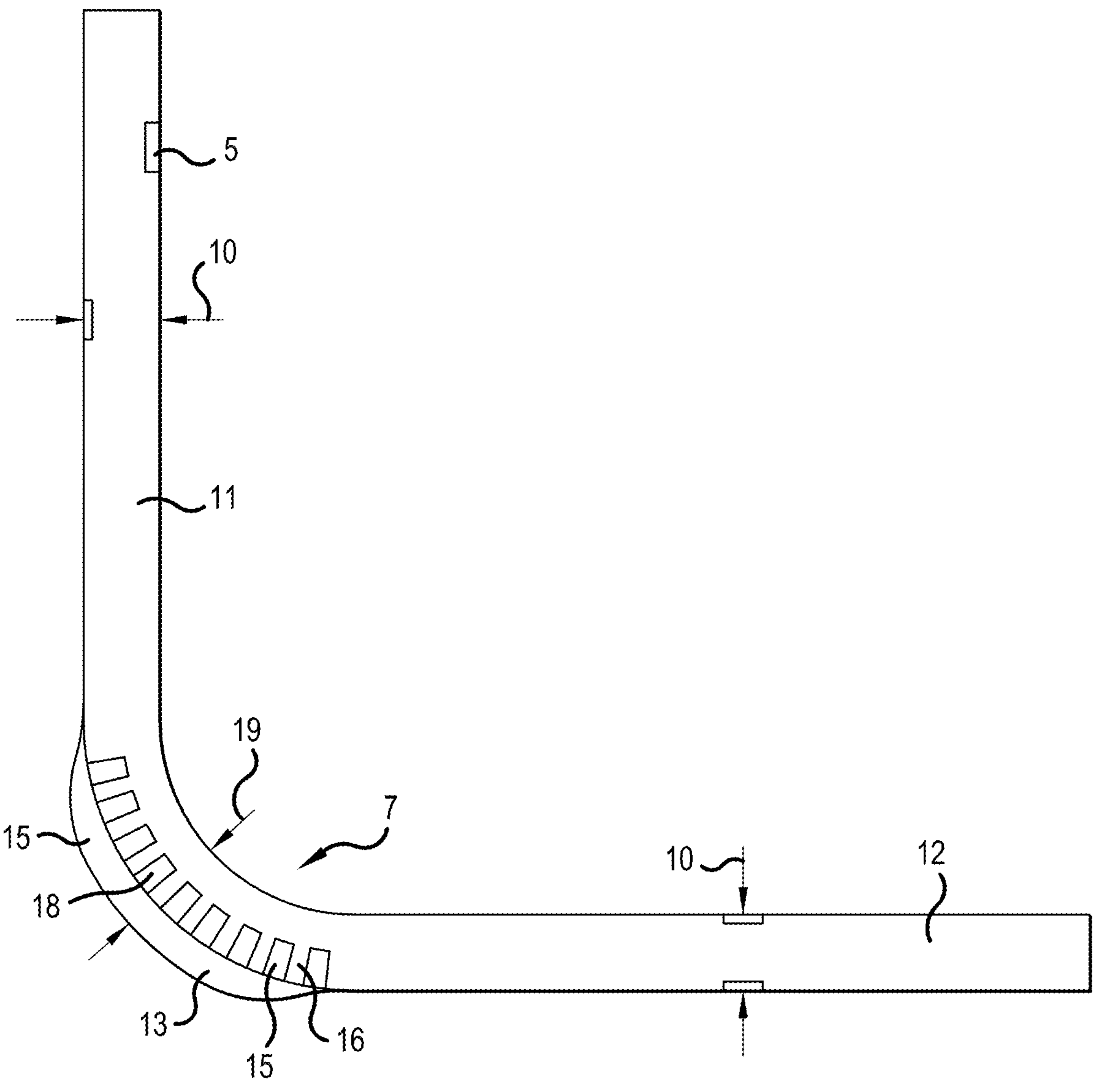

FIG. 4: is a schematic representation of the wall skirting with the groove area FIG. 5: is an embodiment of the wall skirting with serrated lamellae FIG. 6: is an embodiment of the wall skirting with round lamellae FIG. 7: is an embodiment of the wall skirting with angular lamellae FIG. 8: is a rear view of the wall skirting with lamellae and groove areas FIG. 9: is a schematic representation of the wall skirting with a greater material thickness in the bending area FIG. 1 represents the wall skirting 5 according to the invention in the installed state.

The wall skirting 5 according to the invention comprises a front side which forms the visible side. Preferably, the wall skirting 5 is made of the same material as the floor covering 4 and is produced from a strip cutting 9 of the floor covering 4. The front side of the wall skirting 5 thus corresponds to the top side of the floor covering 4. The wall skirting, moreover, has a rear side which becomes connected to the walling 2 and the screed 1. The bending process of the strip cutting 9 or alternatively of the wall skirting 5 creates a convex bending area 7 on the rear side.

The screed 1 is designed as a floating screed 1 and rests on an solid underlying ceiling 8. There is a gap between the screed 1 and the walling 2 in which an edge insulation strip can be arranged.

The transition between the screed 1 and the adjacent walling 2 must be designed as an absolutely moisture-tight connection that does not lose its absolute tightness either due to thermal expansion, shrinkage at low temperatures, or mechanical loads, such as those caused by floor cleaning machines.

Such a moisture-proof connection is achieved with the wall skirting 5 according to the invention. The wall skirting 5 is configured in a curved shape and consists substantially of a first side leg 11, which is connected to the walling 2, and a second side leg 12, which is connected to the screed 1. The bending area 7 is located between the first side leg 11 and the second side leg 12. The second side leg 12 is connected to the floor covering 4 by a weld seam 6.

FIG. 2 shows a strip cutting 9 with a bending area 7. The strip cutting 9 is not yet bent. Material has already been partially removed from area 7, resulting in the formation of lamellae 16 and groove areas 18.

FIG. 3 shows, in detail, the bending area 7 of wall skirting 5 according to FIG. 1. In the bending area 7 of the wall skirting 5, the material has been partially removed and replaced by another filling material 15.

The bending area 7 has a convex rear side and consists of two sections arranged one above the other. The first section is a connecting strip 17. The connecting strip 17 is the area remaining after machining which is not machined. The connecting strip 17 forms the top side of the wall skirting 5 and is the visible area. In the case of the second area, material is first removed by shaving-producing processing and then infilled by a filling material 15.

The removal of the material in bending area 7 is preferably carried out with a specific pattern. Possible patterns include serrations, curves, waves, angular shapes or other geometric shapes. In the case of FIG. 2, it is a strip-shaped pattern, wherein the strips extend in the direction of the longitudinal axis of the strip cutting 9.

The pattern has a wave trough and a wave crest. The wave crest is formed by lamellae 16. The wave trough is formed by groove areas 18. Preferably, the lamellae 16 are formed so high that the material thickness 19 of the filling area 14 corresponds to the material thickness 10 of the wall skirting 5.

FIG. 4 shows the wall skirting 5 with the bending area 7. The connecting strip 17, which forms the visible surface of the wall skirting 6, is located in the bending area 7. The connecting strip 17 comprises a reduced material thickness when compared with the two side legs 11, 12. The reduction of the material thickness in the bending area 7 is carried out by a shaving removing process, whereby material is selectively removed and a filling area 14 is created. Preferably, the material is removed following a specific pattern.

By introducing the filling material 15 into the filling area 14, the shape retention of the wall skirting 5 is supported and the memory behavior is reduced to a minimum. The filling area 14 thereby forms a kind of stabilization, whereby the factory-curved shape of the wall skirting 5 is maintained in the long term.

FIG. 4 shows another embodiment of the wall skirting 5 according to the invention, wherein the filling material 15 in the groove area 18 has been removed completely, which is to say, the material of the wall skirting 5 has been removed without a specific pattern. The single groove area 18 is filled with filling material 15, whereby the material thickness 14 of the bending area 7 corresponds to the material thickness 10 of the two side legs 11, 12. It is also possible that more filling material 15 is filled into the groove area 18, whereby the filling material 15 extends beyond the circumference of the wall skirting 5, thereby forming a kind of edge support wedge.

FIG. 5, FIG. 6 and FIG. 7 respectively show wall skirtings 5 with different lamellae 16 or alternatively groove areas 18. The lamellae 16 are the original material of the wall skirting 5, which material has been machined to create the lamellae. The groove areas 18 are filled in with a filling material 15.

According to FIG. 5, the lamellae 16 and groove areas 18 are serrated. The filling material 15 is filled into the groove area 18 and together with the lamellae 16 forms a unit.

FIG. 6 shows a wall skirting 5 with lamellae 16 and groove areas 18, which are configured in a wave form. The filling material 15 is filled into the wave-shaped groove area 18 and with the wave-shaped lamellae 16 forms a unit.

FIG. 7 shows a wall skirting 5 with angular lamellae 16 and angular groove areas 18.

FIG. 8 shows a flat, unbent strip cutting 9 which is processed into a wall skirting 5. The strip cutting 9 is preferably made of the same material as the floor covering 4 and is separated from the floor covering 4 mechanically.

The rear side of strip cutting 9 is shown in FIG. 8, wherein material has already been partially removed in the future bending area 7. The processing was carried out by the partial removal of material in the form of longitudinal strips, resulting in raised lamellae 16 and incised groove areas 18. The strip cutting 9 now comprises a first section, which later forms the first side leg 11. This is followed by the bending area 7 with the lamellae 16 and the groove areas 18, which are later filled with the filling material 15. The bending area is in turn followed by the second side leg 12, which is later connected to the screed 1.

FIG. 9 shows a further embodiment of the wall skirting 5. The convex bending area 7 comprises a filling area 14, the material thickness 19 of which is greater than the material thickness 10 of the two side legs 11 and 12. The filling material 15 thereby extends beyond the actual circumference of wall skirting 5 and forms a kind of edge support wedge through the projection, which is configured as an elastic coved fillet reinforcement.

DRAWING LEGEND

1. Screed
2. Walling
3.
4. Floor covering
5. Wall skirting
6. Weld seam
7. Bending area

8. Solid underlying ceiling
9. Strip cutting
10. Material thickness of 5
11. 1$^{st}$ side leg
12. 2$^{nd}$ side leg
13. Edge support wedge
14. Filling area
15. Filling material
16. Lamellae
17. Connecting strip
18. Groove area
19. Material thickness of 7

The invention claimed is:

1. A factory-prefabricated wall skirting for a floor covering for manufacturing a moisture-proof wall closure, wherein the factory-prefabricated wall skirting is produced from a strip cutting of the floor covering and comprises a first leg, a bending area connected at one end to the first leg, and a second leg connected to a second end of the bending area, wherein the bending area is round and concave on a front side corresponding to a top side of the floor covering and convex on a rear side of the strip cutting which is configured to face a wall, wherein the strip cutting is bent about the bending area, wherein the bending area on the rear side of the strip cutting have lamellae and groove areas in a predetermined pattern that extend only over an entirety of the bending area, wherein in the bending area of the strip cutting, a material forming the strip cutting is partially removed and replaced by a filling material, wherein the filling material is disposed in the lamellae and groove areas.

2. The factory-prefabricated wall skirting according to claim 1, wherein the filling material consists of a permanently elastic plastic.

3. The factory-prefabricated wall skirting according to claim 1, wherein the filling material consists of a thermoplastic or elastomer.

4. The factory-prefabricated wall skirting according to claim 1, wherein the the lamellae areas extend in a longitudinal direction and are formed from the material of the floor covering and each of the groove areas is recessed on each side of the lamellae areas, and the filling material is arranged in the groove areas.

5. The factory-prefabricated wall skirting according to claim 1, wherein the bending area comprises a material thickness corresponding to a material thickness of the strip cutting.

6. The factory-prefabricated wall skirting according to claim 4, wherein the lamellae areas and the groove areas extend parallel in a direction of a longitudinal axis or perpendicular to the longitudinal axis of the strip cutting.

7. The factory-prefabricated wall skirting according to claim 4, wherein the lamellae areas and the groove areas are arranged at a certain angle with respect to a longitudinal axis of the strip cutting.

8. The factory-prefabricated wall skirting according to claim 1, wherein the filling material extends over a surface of the strip cutting and forms an edge support wedge.

9. The factory-prefabricated wall skirting according to claim 1, wherein the factory-prefabricated wall skirting and the floor covering are connected to each other with a weld seam.

10. A method of manufacturing a factory-prefabricated, strip-shaped wall skirting, comprising the steps of:

machine strip cutting of a floor covering;

partial removal of material of the strip cutting in an original bending area of the factory-prefabricated wall skirting;

bending of the strip cutting in a shaping device, whereby a convex bending area comes to be on a rear side of the strip cutting; and introducing a filling material made of permanently elastic plastic into the convex bending area.

11. The factory-prefabricated wall skirting according to claim 1, wherein the rounded bending area consists of two sub-areas arranged one above another, wherein a first sub-area is an unprocessed connecting strip and a second, processed sub-area is filled with the filling material.

12. A floor structure comprising a floor covering and a factory-made wall skirting for the floor covering to create a moisture-proof wall finish, wherein the factory-made wall skirting is made from a strip cut of the floor covering and the factory-made wall skirting and the floor covering are connected to each other by a weld seam, wherein a front side of the factory-made wall skirting corresponds to an upper side of the floor covering and the factory-made wall skirting consists of a first leg, a second leg, and a curved bending area located between the first leg and the second leg, wherein the curved bending area is round and concave on the front side and convex on a back side of the strip cut, wherein the curved bending area on the back side of the strip cut have lamellae and groove areas cut in a predetermined pattern that extend only over an entirety of the curved bending area, wherein a permanently elastic filling material is disposed in the lamellae and groove areas.

* * * * *